Aug. 19, 1958 J. A. GAYLORD 2,847,747
WEBBING ADJUSTER
Filed Jan. 3, 1956
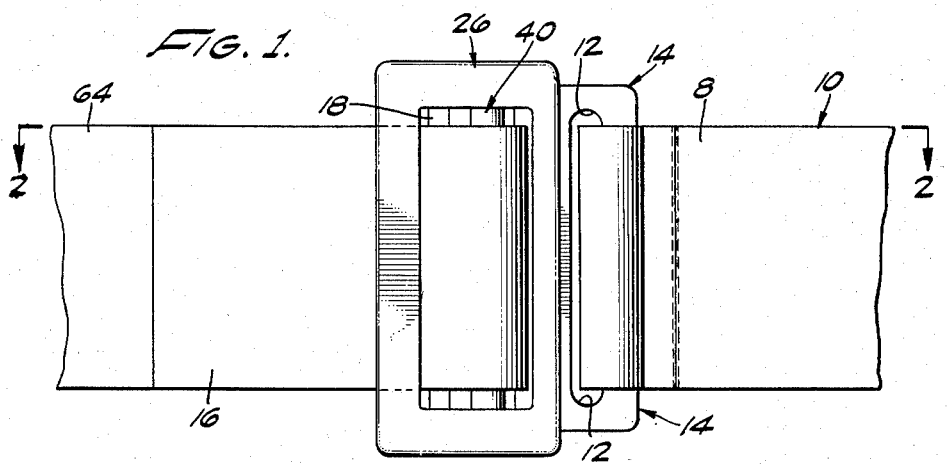
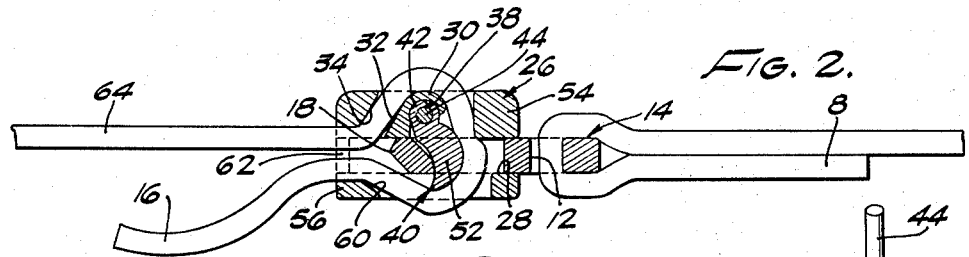
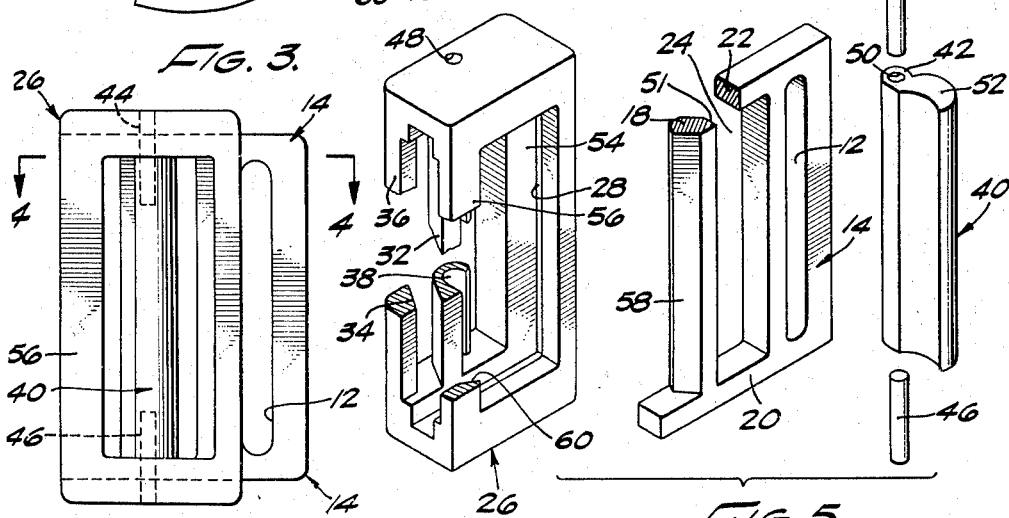
JOHN A. GAYLORD
INVENTOR.
BY *Lyon & Lyon*
ATTORNEYS United States Patent Office 2,847,747
Patented Aug. 19, 1958

2,847,747

WEBBING ADJUSTER

John A. Gaylord, Pacific Palisades, Calif., assignor of one-half to Rocket Jet Engineering Corp., Glendale, Calif., a corporation of California Application January 3, 1956, Serial No. 556,955

8 Claims. (Cl. 24—170)

This invention relates to an improved webbing adjuster.

It is an object of this invention to provide an adjuster which presents only smooth surfaces over which the webbing passes to increase the longevity of the webbing.

It is a further object of the invention to provide an adjuster which is readily and easily operated but which maintains a sure hold on the webbing.

It is still a further object of this invention to provide a webbing adjuster wherein the force applied upon the webbing to hold same is substantially larger than any force pulling on the webbing to release same and increases with an increase of the pulling force.

Other objects and advantages will be readily apparent from the following description.

In the drawings:

Figure 1 is a plan view of a webbing adjuster embodying this invention.

Figure 2 is a sectionaal view taken along line 2—2 of Figure 1.

Figure 3 is a plan view of the adjuster with the webbing removed.

Figure 4 is a sectional view taken along line 4—4 of Figure 3.

Figure 5 is a diagrammatic view of the component elements with portions broken away.

One end 8 of the webbing 10 passes through slot 12 of the saddle bar 14, is doubled back and stitched as seen in Figure 2. The opposite extremity 16 of the webbing is free to be inserted into the webbing adjuster. It is contemplated that the webbing may be of any suitable type well known to those skilled in the art although the adjuster is particularly adapted for nylon webbing which, although very strong, is easily frayed if forced over a rough surface.

The saddle bar 14 carries at the extremity opposed to the slot 12 a post 18 mounted between upper and lower arms 20 and 22 of the saddle bar forming an opening 24 in the saddle bar.

A slider 26 is provided having a slot 28 receiving saddle bar 14 permitting longitudinal movement of the slider on the saddle bar. Both the front and rear faces of the slider have an opening therein to permit reeving of the loose end 16 of the webbing therethrough. Substantially centrally located in the rear opening a locking lever limiting bar 30 is provided. This bar has an inclined face 32 which is spaced from a parallel face 34 on corner post 36 of the slider and is spaced therefrom a distance slightly greater than the thickness of the webbing 10. Thus, when the loose end 16 is reeved through the adjuster it first passes through the inclined path formed between bar 30 and post 36.

The outer portion of bar 30 is curved providing a smooth surface over which the webbing may pass and also forming a C-shaped jaw 38 for receiving the locking lever 40.

The lever 40 extends the width of the webbing 10 and has a rounded extremity 42 fitting within jaw 38. A pair of pins 44 and 46 pass through suitable holes such as 48 in the slider into holes such as 50 in the locking lever 40 thereby pivotally mounting the lever in the adjuster.

The locking lever 40 is mounted in the slider 26 after insertion of saddle bar 14 and the locking end thereof projects through opening 24 in the saddle bar thereby preventing disassembly of the adjuster.

The locking lever's pivoting is limited in a counterclockwise direction in Figure 2 by engagement with the extremity of jaw 38 and in a clockwise direction by engagement with post 18 which has an inner face 51 thereon which engages said lever.

The locking lever 40 has an addition to the rounded extremity 42 a crescent shaped body 52, the tip of which extends beyond post 18 into the opening in the front of slider 26. The webbing is thus reeved between post 54 of slider 26, opposed to post 36, and the crescent shaped body 52 of locking member 40 which crescent shape opens towards post 18. The webbing is then reeved over the tip of locking member 40 and passes back between post 18 on saddle bar 14 and corner post 56 of slider 26. The post 18 has an inclined face 58 corresponding to parallel face 60 on post 56 forming a passage through which the webbing passes. The webbing end 16 then passes through slot 62 which also admits the webbing prior to its passage between post 36 and bar 30.

In use the webbing is reeved through the slider 26 and around locking lever 40 and back out again in the manner above described. When a pulling force is applied on the portion of the webbing designated 64 the slider 26 is moved to the left in Figure 2. The locking member 40 strikes post 18 on saddle bar 14 and pivots counterclockwise in Figure 2 upon further movement of the slider pinching the webbing between post 54 and the back of the crescent shaped body 52 of locking member. Thus the stronger the pull the tighter the grip on the webbing. When it is desired to loosen the webbing or release the end 16 the slider 26 is moved manually towards the right, that is towards saddle bar 14 (Figure 2) thereby increasing the distance between post 54 and locking member 40 permitting the webbing to pass therebetween.

A substantial mechanical advantage is realized as the movement of post 18 is almost two times the length of movement of the locking member 40 due to the curvature thereof giving a mechanical advantage of nearly two to one. Also the wedging action between post 54 and locking member 40 again substantially increases the mechanical advantage.

While what hereinbefore has been described is the preferred embodiment of this invention it is readily apparent that alterations and modifications of this invention can be resorted to without departing from the scope of this invention and such alterations and modifications are intended to be included within the scope of the appended claims.

I claim:

1. An adjuster for a webbing comprising a slider having four corner posts forming a longitudinal slot therethrough, a saddle bar adapted to have one extremity of said webbing affixed thereto and a post formed thereon adapted to enter said slot, a locking member pivotally mounted adjacent said slot and between a pair of said posts and projecting between said post and the webbing receiving portion of said saddle bar, a free extremity of said webbing being reeved through said longitudinal slot around said locking member and back out said longitudinal slot.

2. An adjuster for a webbing comprising a slider having a longitudinal slot and a pair of oppositely disposed transverse slots, a saddle bar entering said longitudinal slot carrying a post at its extremity and having a transverse slot adjacent said post and a locking member pivotally mounted in said slider and projecting into said transverse slot in said saddle bar, a free extremity of said webbing being reeved through said longitudinal slot around said locking member and back out said longitudinal slot.

3. An adjuster for a webbing comprising a slider having a longitudinal slot and a pair of oppositely disposed transverse slots, a saddle bar entering said longitudinal slot carrying a post at its extremity and having a transverse slot adjacent said post and a locking member pivotally mounted in one of the transverse slots in said slider projecting through the transverse slot in said saddle bar, a free extremity of said webbing being reeved through said longitudinal slot around said locking member and back out said longitudinal slot.

4. An adjuster for a webbing comprising a slider having a longitudinal slot and a pair of oppositely disposed transverse slots, a saddle bar entering said longitudinal slot carrying a post at its extremity and having a transverse slot adjacent said post and a locking member pivotally mounted in one of the transverse slots in said slider projecting through the transverse slot in said saddle bar and into the remaining transverse slot in said slider, a free extremity of said webbing being reeved through said longitudinal slot around said locking member and back out said longitudinal slot.

5. An adjuster for a webbing comprising a slider having a longitudinal slot and a pair of oppositely disposed transverse slots, a saddle bar entering said longitudinal slot carrying a post at its extremity and having a transverse slot adjacent said post and a locking member pivotally mounted in said slider and projecting into said transverse slot in said saddle bar wherein the extremities of the transverse slots in said slider adjacent said post are inclined with respect to said longitudinal slot to permit easy ingress and egress of the free end of said webbing, a free extremity of said webbing being reeved through said longitudinal slot around said locking member and back out said longitudinal slot.

6. An adjuster for a webbing comprising a slider having a longitudinal slot and a pair of oppositely disposed transverse slots, a saddle bar entering said longitudinal slot carrying a post at its extremity and having a transverse slot adjacent said post and a crescent shaped locking member pivotally mounted in one of the transverse slots in said slider and projecting into said transverse slot in said saddle bar, a free extremity of said webbing being reeved through said longitudinal slot around said locking member and back out said longitudinal slot.

7. An adjuster for a webbing comprising a slider having a longitudinal slot and a pair of oppositely disposed transverse slots, a saddle bar entering said longitudinal slot carrying a post at its extremity and having a transverse slot adjacent said post wherein the extremities of the transverse slots in said slider adjacent said post are inclined with respect to said longitudinal slot to permit easy ingress and egress of the free end of said webbing and a crescent shaped locking member pivotally mounted in one of the transverse slots in said slider and projecting into said transverse slot in said saddle bar, a free extremity of said webbing being reeved through said longitudinal slot around said locking member and back out said longitudinal slot.

8. An adjuster for a webbing comprising a slider having a longitudinal slot and a pair of oppositely disposed transverse slots, a saddle bar entering said longitudinal slot carrying a post at its extremity and having a transverse slot adjacent said post wherein the extremities of the transverse slots in said slider adjacent said post are inclined with respect to said longitudinal slot to permit easy ingress and egress of the free end of said webbing and a crescent shaped locking member pivotally mounted in one of the transverse slots in said slider and projecting into said transverse slot in said saddle bar and a limiting bar in said slider adjacent said locking lever and guiding said webbing around said locking lever, a free extremity of said webbing being reeved through said longitudinal slot around said locking member and back out said longitudinal slot.

References Cited in the file of this patent

UNITED STATES PATENTS

| 982,433 | Knights et al. | Jan. 24, 1911 |
| 2,191,228 | Dowd | Feb. 20, 1940 |
| 2,526,705 | Smith | Oct. 24, 1950 |

FOREIGN PATENTS

| 266,053 | Italy | July 17, 1929 |